United States Patent Office 3,445,265
Patented May 20, 1969

3,445,265
COATING WOOD OR METAL WITH ORGANO-
POLYSILOXANE RESIN
Roy Bentley, Largs, and John Craig, Paisley, Scotland,
assignors to Imperial Chemical Industries Limited, London, England, a corporation of Great Britain
No Drawing. Filed Jan. 5, 1966, Ser. No. 518,798
Claims priority, application Great Britain, Jan. 11, 1965,
1,203/65
Int. Cl. B32b *15/08, 21/08;* B44d *1/092*
U.S. Cl. 117—49                                  18 Claims

ABSTRACT OF THE DISCLOSURE

There is provided a process for treating surfaces of wood or metal by applying to the surface an aminobutanol or a salt thereof, and then applying to the surface an organopolysiloxane resin composition and thereafter curing or allowing the resin to cure to an insoluble infusible state. The product of the process is characterized by having coated on the wood or metal surface an organopolysiloxane resin composition cured to the insoluble infusible state, the surface having applied thereto prior to the application of the organopolysiloxane resin composition an aminobutanol or a salt thereof.

---

This invention relates to the treatment of surfaces, for example, such as wood or metal and the like with organopolysiloxane resins.

Surfaces of wood, metal and the like have been treated with organopolysiloxane resins for a variety reasons such as to confer water repellency or anti-stick properties but the hitherto available treatments have not, in all cases, been entirely satisfactroy. In many cases, for example, there has been failure to achieve good bonding although the other characteristics desired such as good anti-stick properties may have been achieved.

According to the present invention a new and improved process for treating surfaces of wood, metal and the like comprises applying to such a surface an aminobutanol or a salt thereof, applying to the surface an organopolysiloxane resin composition and thereafter curing or allowing said resin to cure to the insoluble, infusible state.

The aminobutanol or salt thereof may, for example, be selected from 2-amino-1-butanol and salts thereof such as the acetate and formate. 2-amino-1-butanol is in many cases preferred. The aminobutanol or salt thereof, if liquid, may be applied directly to the surface by any suitable means such as brushing, dipping, spraying or wiping with a pad previously saturated therewith. Alternatively it may be applied in the form of a solution in water or an organic solvent, for example, isopropanol, ethanol, xylene or toluene, and the solvent allowed to evaporate before treating with the organopolysiloxane resin composition.

The organopolysiloxane resin composition preferably comprises a mixture of homo-polymeric or copolymeric organopolysiloxanes having a ratio of organo groups to silicon atoms of from 0.9:1 to 1.9:1 and having at least 2 silicon-bonded hydroxyl groups per molecule, a liquid substantially linear diorganopolysiloxane and a poly-functional silane or siloxane having at least 3 functional groups per molecule. If it is not desired to get anti-stick properties the linear diorganopolysiloxane may be omitted.

The organo groups in the homo-polymeric or coplymeric organopolysiloxane may be selected from alkyl, aryl, alkaryl, aralkyl or alkenyl groups. Suitable groups which may be present include methyl, propyl, trifluoropropyl, hexyl, phenyl tetrachlorophenyl, benzyl, tolyl, xylyl, vinyl and styryl groups. It is, however, normally preferred that the organo groups be methyl groups. The silicon-bonded hydroxyl groups may be present in greater amounts than 2 per molecule. It is also preferred that the ratio of organo groups to silicon atoms be from 1.0:1 to 1.2:1. Suitable homo-polymeric or copolymeric organplysilxanes include products prepared by hydrolysis and condensation from mixtures of organohalogenosilanes in which the ratio of organo groups to silicon atoms is from 0.9:1 to 1.9:1. Mixtures of methyltrichlorosilanes and dimethyldichlorosilanes are particularly valuable for preparing suitable organopolysiloxanes.

The liquid substantially linear diorganopolysiloxane may be terminated by triorganosilyl groups or diorganohydroxysilyl groups. The organo groups therein may be selected from alkyl, aryl, alkaryl, aralkyl or alkenyl groups. Suitable groups which may be present include, for example, methyl, propyl, trifluoropropyl, phenyl, tetrachlorophenyl, tolyl, benzyl, vinyl or styryl groups.

The poly-functional silane or siloxane having at least 3 functional groups per molecule may have as the functional groups the group SiH or SiOR where R is a hydrocarbyl radical or acyl radical. In many cases it is preferred that the poly-functional compound be of the general formula $R(R'O)_3Si$, an orthosilicate, a polysilicate or a partial hydrolysate thereof such as $$R(R'O)_2SiO[SiR(OR')O]_xSiR(OR')_2$$

and $$R(R'O)_2SiOSiR[OSiR(OR')_2]_2$$

However, it is further preferred that the poly-functional compound be composed of molecules consisting essentially of units of the general formula $$(R'O)_mSiO_{4-m/2}$$

in which R' is an R group having not more than 11 carbon atoms or a substituted ether in which the chain has a total of not more than 11 carbon and oxygen atoms and m is 2, 3 or 4. This formula represents both orthosilicates and polysilicates. The term "orthosilicate" as used herein refers to a compound of the general formula $(R'O)_4Si$. The term "polysilicate" as used herein refers to compounds having such configurations as, for example:

$$(R'O)_3SiOSi(OR')_3, [Si(OR')_2O]_y$$

where y is at least 3,

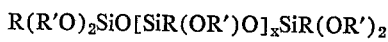

and $$(R'O)_3SiO[Si(OR')_2O]_xSi(OR')_3$$

where x is at least 1. The polysilicates operative in this invention are solvent-soluble partial hydrolysates of the orthosilicates.

Mixtures of the orthosilicates, trifunctional silanes and their partial hydrolysates are operative as well as cohydrolysates of these materials. Examples of such cohydrolysates include:

$$(RO)_2RSiOSi(OR)_3$$

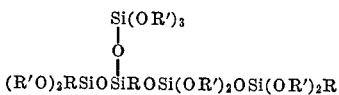

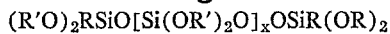

and

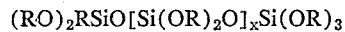

where $x$ is at least 1.

Materials which are particularly useful are ethyl orthosilicate, triethoxysilane and material derived from these by partial hydrolysis and/or polymerisation.

The proportions of the three constituents in the polysiloxane resin composition may, of course, vary widely. It is, however, normally preferred that the homo-polymeric or copolymeric organopolysiloxane should be present in amounts of from 10 to 20 percent by weight. The diorganopolysiloxane is preferably present in amount from 0 to 2 percent by weight and the poly-functional silane or siloxane is preferably present in amount from 0.5 to 5 percent by weight. The organopolysiloxane resin composition may also include other constituents such as emulsifiers or curing agents in small amounts, the remainder being solvent.

Our invention is further illustrated by the following examples in which all parts and percentages are by weight.

EXAMPLE 1

The aluminium surface of a frying pan was treated by applying thereto 2-amino-1-butanol in the form of a 10 percent solution in isopropanol by wiping with a felt pad impregnated therewith. The solvent was allowed to evaporate and the aluminium surface was then sprayed with a solution containing 15 parts of a homo-polymeric methylsiloxane having 1.15 methyl groups per silicon atom and containing free silanol groups, 0.15 part of a trimethylsilyl-ended linear dimethylpolysiloxane of viscosity 1,000 cs. at 25° C., 1 part of a dimethylhydroxy-ended linear dimethylsiloxane of viscosity 3,000 cs. at 25° C., 3.0 parts of ethyl silicate, 1.4 parts of ethyl cellulose and 79.45 parts of a mixed solvent consisting of butanol, isopropanol and toluene. The resin composition was then allowed to air dry at 20° C. and after 1 hour was found to be strongly bonded to the metal and capable of releasing cooked foodstuffs, for example, an egg cooked without fat.

EXAMPLE 2

The aluminium surface of a frying pan was treated by applying 2-amino-1-butanol in the form of a 10 percent solution in isopropanol by wiping with a felt pad impregnated therewith. The solvent was allowed to evaporate and the surface then sprayed with a solution containing 15 parts of a copolymeric methylphenylsiloxane containing 0.99 methyl group per silicon atom and 0.54 phenyl group per silicon atom and containing free silanol groups, 0.15 part of a trimethylsilyl-ended linear dimethylpolysiloxane of viscosity 1,000 cs. at 25° C., 1 part of a dimethylhyl-hydroxy-ended linear dimethylsiloxane of viscosity 3,000 cs. at 25° C., 3.0 parts of ethyl silicate, 1.4 parts of ethyl cellulose and 79.45 parts of mixed solvent consisting of butanol, isopropanol and toluene. The resin composition was allowed to dry at 20° C. for 1 hour, after which it was strongly bonded to the metal and capable of releasing cooked foodstuffs.

EXAMPLE 3

The aluminum surface of a frying plan was treated with the acetate of 2-amino-1-butanol in the form of a 10 percent solution in isopropanol by wiping with a felt pad impregnated therewith. The solvent was allowed to evaporate and the surface then sprayed with a solution containing 15 parts of a homopolymeric methyl siloxane having 1.15 methyl groups per silicon atom and containing free silanol groups, 0.15 part of a trimethylsilyl-ended linear dimethyl polysiloxane of viscosity 1,000 cs. at 25° C., 1 part of a dimethylhydroxy-ended linear dimethylsiloxane of viscosity 3,000 cs. at 25° C., 3.0 parts of ethyl silicate, 1.4 parts of ethyl cellulose and 79.45 parts of a mixed solvent consisting of butanol, isopropanol and toluene. The resin composition was allowed to dry for 1 hour after which it was found to be strongly bonded to the metal and capable of releasing cooked foodstuffs.

EXAMPLE 4

The aluminium surface of a frying pan was treated with the butyrate of 2-amino-1-butanol applied as a 10 percent solution in isopropanol by wiping the surface with a felt pad impregnated therewith. The solvent was allowed to dry and the surface then sprayed with a solution containing 15 parts of a homo-polymeric methyl siloxane having 1.15 methyl groups per silicon atom and containing free silanol groups, 0.15 part of a trimethylsilyl-ended linear dimethylpolysiloxane of viscosity 1,000 cs. at 25° C., 1 part of a dimethylhydroxy-ended linear dimethylsiloxane of viscosity 3,000 cs. at 25° C., 3.0 parts of ethyl silicate, 1.4 parts of ethyl cellulose and 79.45 parts of a mixed solvent consisting of butanol, isopropanol and toluene. The resin composition was allowed to dry for 1 hour at 20° C. after which it was found to be strongly bonded to the metal and capable of releasing cooked foodstuffs.

EXAMPLE 5

The aluminum surface of a frying pan was treated with 2-amino-1-butanol in the form of a 10 percent solution in isopropanol, applied by wiping with a felt pad impregnated therewith. The solvent was allowed to evaporate and the surface sprayed with a solution containing 15 parts of a homo-polymeric methyl siloxane containing 1.15 methyl groups per silicon atom and containing free silanol groups, 0.15 part of a trimethylsilyl-ended linear dimethylpolysiloxane of viscosity 1,000 cs. at 25° C., 1 part of a dimethyl hydroxy-ended linear dimethylsiloxane of viscosity 3,000 cs. at 25° C., 3.0 parts of methyl tri-acetoxy silane, 1.4 parts of ethyl cellulose and 79.45 parts of mixed solvent consisting of butanol, isopropanol and toluene. The resin composition was allowed to air dry at 20° C. for 1 hour, after which it was found to be strongly bonded to the metal and capable of releasing cooked foodstuffs.

EXAMPLE 6

The aluminum surface of a frying pan was treated with 2-amino-1-butanol in the form of a 10 percent solution in isopropanol applied by wiping with a felt pad impregnated therewith. The solvent was allowed to evaporate and the surface then sprayed with a solution containing 15 parts of a homo-polymeric methyl siloxane containing 1.15 methyl groups per silicon atom and containing free silanol groups, 0.15 part of a trimethylsilyl-ended linear dimethylpolysiloxane of viscosity 1,000 cs. at 25° C., 1 part of a dimethylhydroxy-ended linear dimethylsiloxane of viscosity 3,000 cs. at 25° C., 3.0 parts of tetra-acetoxy silane, 1.4 parts of ethyl cellulose and 79.45 parts of mixed solvent consisting of butanol, isopropanol and toluene. The resin composition was allowed to air dry at 20° C. for 1 hour, after which it was found to be strongly bonded to the metal and capable of releasing cooked foodstuffs.

EXAMPLE 7

The aluminium surface of a frying pan was treated with 2-amino-1-butanol in the form of a 10 percent solution in isopropanol applied by wiping with a felt pad impregnated therewith. The solvent was allowed to evaporate and the surface then sprayed with a solution containing 15 parts of homopolymeric methyl siloxane containing 1.15 methyl group per silicon atom and containing free silanol groups, 0.15 part of a trimethylsilyl-ended linear dimethyl polysiloxane of viscosity 1,000 cs. at 25° C., 1 part of a dimethylhydroxy-ended linear dimethyl siloxane of viscosity 3,000 cs. at 25° C., 3.0 parts of triethoxy hydrogen silane, 1.4 parts of ethyl cellulose and 79.45 parts of mixed solvents consisting of butanol, isopropanol and toluene. The resin composition was allowed to air dry at 20° C. for 1 hour, after which it was found to be strongly bonded to the metal and capable of releasing cooked foodstuffs.

EXAMPLE 8

The aluminium surface of a frying pan was treated with 2-amino-1-butanol in the form of a 10 percent solution in isopropanol, applied by wiping with a felt pad impregnated therewith. The solvent was allowed to evaporate and the surface then sprayed with a solution containing 15 parts of a homo-polymeric methyl siloxane containing 1.15 methyl groups per silicon atom and containing free silanol groups, 0.15 part of a trimethylsilyl-ended linear dimethyl polysiloxane of viscosity 1,000 cs. at 25° C., 1 part of a dimethyl hydroxy-ended linear dimethylsiloxane of viscosity 3,000 cs. at 25° C., 3.0 parts of dimethyl tetra ethoxy disilane, 1.4 parts of ethyl cellulose and 79.45 parts of a mixed solvent consisting of butanol isopropanol and toluene. The resin composition was allowed to air dry at 20° C. for 1 hour, after which it was found to be strongly bonded to the metal and capable of releasing cooked foodstuffs.

EXAMPLE 9

The aluminium surface of a frying pan was treated with 2-amino-1-butanol in the form of a 10 percent solution in isopropanol, applied by wiping with a felt pad impregnated therewith. The solvent was allowed to evaporate and the surface sprayed with a solution containing 15 parts of a copolymeric methylphenylsiloxane containing 0.82 methyl group per silicon atom and 0.55 phenyl group per silicon atom and containing free silanol groups, 0.15 part of a trimethylsilyl-ended linear dimethyl polysiloxane of viscosity 1,000 cs. at 25° C., 1 part of a dimethylhydroxy-ended linear dimethylsiloxane of viscosity 3,000 cs. at 25° C., 3.0 parts ethyl silicate, 1.4 parts ethyl cellulose and 79.45 parts of a mixed solvent consisting of butanol, isopropanol and toluene. The resin composition was then allowed to air dry for 1 hour at 20° C., after which it was found to be strongly bonded to the metal and capable of releasing cooked foodstuffs.

EXAMPLE 10

The aluminium surface of a frying pan was treated with 2-amino-1-butanol in the form of a 10 percent solution in isopropanol, applied by wiping with a felt pad impregnated therewith. The solvent was allowed to evaporate and the surface then sprayed with a solution containing 15 parts of a homo-polymeric methylsiloxane containing 1.15 methyl groups per silicon atom and containing free silanol groups, 0.15 part of a trimethylsilyl-ended linear dimethylpolysiloxane of viscosity 1,000 cs. at 25° C., 1 part of a dimethylhydroxy-ended linear dimethylsiloxane of viscosity 3,000 cs. at 25° C., 3.0 parts of a methylhydrogen polysiloxane containing 1.07 methyl group per silicon atom and 0.97 hydrogen atom per silicon atom, 1.4 parts of ethyl cellulose and 79.45 parts of a mixed solvent consisting of butanol, isopropanol and toluene. The resin composition was allowed to air dry at 20° C. for 1 hour, after which it was found to be strongly bonded to the metal and capable of releasing cooked foodstuffs.

EXAMPLE 11

The procedure of Example 1 was repeated except that the aluminium surface was replaced by a mild steel surface. The resin composition was found to be strongly bonded to the metal and to be capable of releasing cooked foodstuffs.

EXAMPLE 12

The procedure of Example 1 was repeated except that an enamelled saucepan was used in place of the frying pan. The resin composition was found to be strongly bonded to the enamel and to be capable of releasing cooked foodstuffs.

EXAMPLE 13

The procedure of Example 1 was repeated except that the frying pan was replaced by an aluminium mould. The resin composition was found to be strongly bonded to the metal and to be capable of releasing an article moulded in polyurethane foam.

What we claim is:

1. A process for treating surfaces selected from wood and metal comprising applying to such a surface an aminobutanol or a salt thereof, then applying to the surface an organopolysiloxane resin composition and thereafter curing or allowing said resin to cure to the insoluble, infusible state.

2. A process according to claim 1 wherein the aminobutanol is 2-amino-1-butanol.

3. A process according to claim 1 wherein the aminobutanol or salt thereof is the acetate or formate of 2-amino-1-butanol.

4. A process according to claim 1 wherein the aminobutanol or salt thereof is applied in the form of a solution in water or an organic solvent, and the solvent is allowed to evaporate before treating the surface with the organopolysiloxane composition.

5. A process according to claim 4 wherein the solvent is isopropanol, ethanol, xylene or toluene.

6. A process according to claim 1 wherein the organopolysiloxane resin composition comprises a mixture of homo-polymeric or copolymeric organopolysiloxanes having a ratio of organo groups to silicon atoms of from 0.9:1 to 1.9:1 and having at least 2 silicon-bonded hydroxyl groups per molecule, a liquid substantially linear diorganopolysiloxane and a poly-functional silane or siloxane having at least 3 functional groups per molecule.

7. A process according to claim 6 wherein the organo groups in the homo-polymeric or copolymeric organopolysiloxane are selected from methyl, propyl, trifluoropropyl, hexyl, phenyl, tetrachlorophenyl, benzyl, tolyl, xylyl, vinyl or styryl groups.

8. A process according to claim 6 wherein the ratio of organo groups to silicon atoms in the homo-polymeric or copolymeric organopolysiloxanes is from 1.0:1 to 1.2:1.

9. A process according to claim 6 wherein the liquid substantially linear diorganopolysiloxane is terminated by triorganosilyl groups or diorganohydroxysilyl groups.

10. A process according to claim 6 wherein the organo groups in the substantially linear diorganopolysiloxane are methyl, propyl, trifluoropropyl, hexyl, phenyl, tetrachlorophenyl, benzyl, tolyl, xylyl, vinyl or styryl groups.

11. A process according to claim 6 wherein the functional groups in the poly-functional silane or siloxane are the groups SiH or SiOR where R is a hydrocarbyl radical or acyl radical.

12. A process according to claim 6 wherein the poly-functional compound is of the general formula $R(R'O)_3Si$, where R is a hydrocarbyl or acyl radical and R' is hydrocarbyl or acyl radical having not more than 11 carbon atoms or a substituted ether in which the chain has a total of not more than 11 carbon and oxygen atoms.

13. A process according to claim 6 wherein the poly-functional compound is an orthosilicate, a polysilicate or a partial hydrolysate thereof.

14. A process according to claim 6 wherein the poly-functional compound is composed of molecules consisting essentially of units of the general formula $$(R'O)_m SiO_{4-m/2}$$

in which R' is a hydrocarbyl or acyl radical having not more than 11 carbon atoms or a substituted ether in which the chain has a total of not more than 11 carbon and oxygen atoms and $m$ is 2, 3 or 4.

15. A process according to any of the preceding claims wherein the homo-polymeric or copolymeric organopolysiloxane is present in amount from 10 to 20 percent by weight of the polysiloxane resin composition.

16. A process according to claim 6 wherein the diorganopolysiloxane is present in amount from 0 to 2 percent by weight of the polysiloxane resin composition.

17. A process according to claim 6 wherein the polyfunctional silane or siloxane is present in amount from 0.5 to 5 percent by weight of the composition.

18. Surfaces selected from wood and metal having coated thereon an organopolysiloxane resin composition cured to the insoluble, infusible state, said surface having applied thereto prior to the application of the said organopolysiloxane resin composition an aminobutanol or a salt thereof.

References Cited

UNITED STATES PATENTS 3,017,284   1/1962   Lambert et al. _____ 117—49 X
3,088,847   5/1963   Pines _____ 117—132 X RALPH S. KENDALL, Primary Examiner.

U.S. Cl. X.R.

117—57, 132, 148